United States Patent [19]

Kimisawa

[11] Patent Number: 4,840,001
[45] Date of Patent: Jun. 20, 1989

[54] DEVICE FOR MOUNTING WINDOW PANE

[75] Inventor: Toshihide Kimisawa, Yokohama, Japan

[73] Assignee: Nifco Inc., Yokohama, Japan

[21] Appl. No.: 298,011

[22] Filed: Jan. 18, 1989

[30] Foreign Application Priority Data

Jan. 30, 1988 [JP] Japan ............................ 63-10460[U]

[51] Int. Cl.$^4$ ............................ B60J 1/00; E06B 3/58
[52] U.S. Cl. .................................... 52/208; 296/93
[58] Field of Search .................... 296/93, 84.1; 52/208

[56] References Cited

U.S. PATENT DOCUMENTS 4,349,993 9/1982 Tanaka .................................. 52/208

FOREIGN PATENT DOCUMENTS 3540961 5/1987 Fed. Rep. of Germany ........ 296/93
60-189628 9/1985 Japan .
62-139710 9/1987 Japan .
63-13 1/1988 Japan .

Primary Examiner—John E. Murtagh
Attorney, Agent, or Firm—Oblon, Spivak, McClelland, Maier & Neustadt

[57] ABSTRACT

A device for mounting a window pane in a depression formed in a vehicle panel to enclose an area slightly larger than the area of the window pane includes a plastic fastener and a counter-fastener. The plastic fastener is set along the inner side surface of the depression. The counter-fastener is supported by the fastener to hold the edge of the window pane. The fastener is provided with an auxiliary member provided at a position corresponding to the corner of the depression for supporting the counter-fastener.

2 Claims, 1 Drawing Sheet

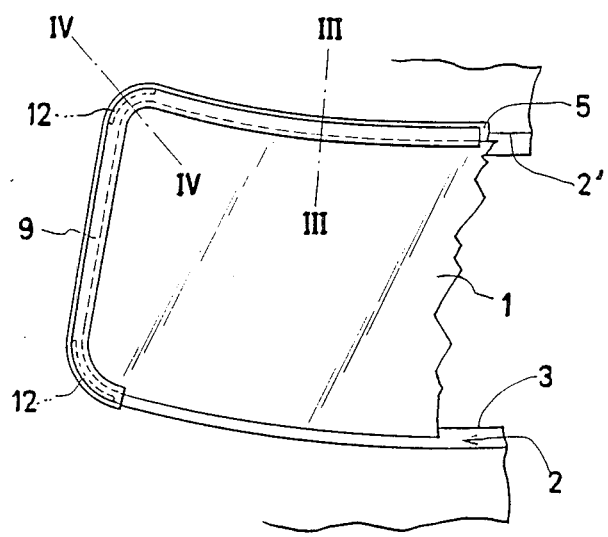
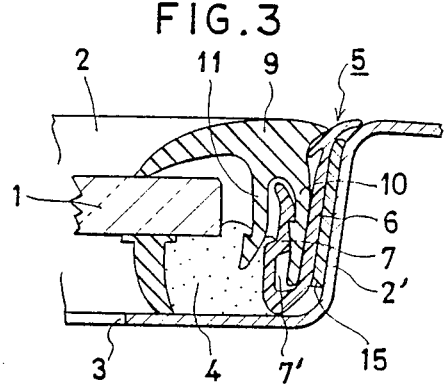
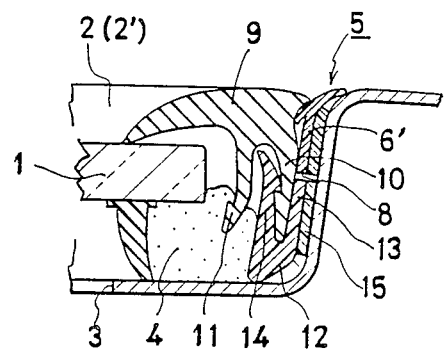

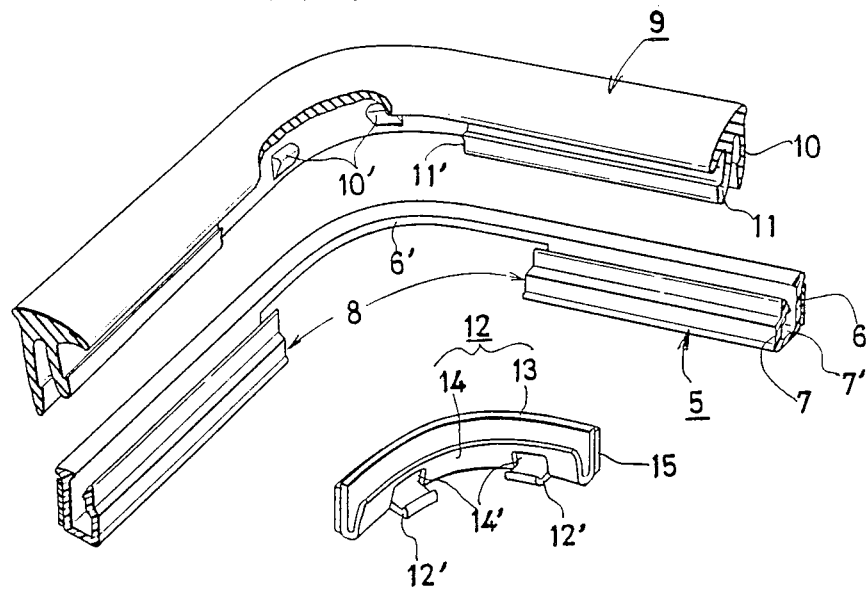
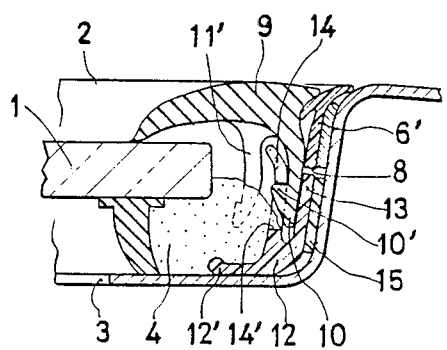
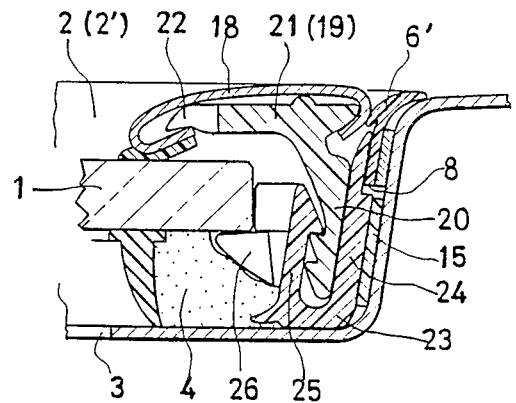

DEVICE FOR MOUNTING WINDOW PANE

BACKGROUND OF THE INVENTION

1. Field of the Invention

This invention relates to a device for mounting a window pane and, more particularly, to a device for mounting a window pane in a body panel of a vehicle or the like by providing the body panel with a depression which encloses an area slightly larger than the area of the window pane of a windshield or rear window, fitting the window pane in the depression, bonding the edge of the pane to the bottom of the depression and mounting a fastener and a counter-fastener along the inner side surface of the depression including four curved corners thereof, thereby holding the edge of the window pane.

2. Prior Art Statement

Japanese Patent Publication No. 60-52003 and Japanese Patent Disclosure No. 61-188221 disclose a device for mounting a window pane in a body panel of a vehicle or the like by forming the body panel with a depression which encloses an area slightly larger than the area of the window pain, bonding a flexible plastic fastener having a J-shaped sectional profile along the inner side surface of the depression and fitting a plastic counter-fastener in the fastener or fitting a counter-fastener made of a metal to the fastener with a plurality of clips provided at a suitable interval to hermetically and ornamentally hold the edge of the window pane.

The flexible plastic fastener is formed by extrusion molding and has a mounting portion secured by a double sided adhesive tape or the like to the inner side surface of the depression and a folded portion extending upwardly from the lower end of the mounting portion. Since the fastener has the folded portion, it cannot follow the curved side surface of the depression at the corner when it is fitted along the inner side wall, thus resulting in formation of wrinkles, which is undesirable from the standpoint of appearance. Therefore, its portion corresponding to the corner of the depression is formed with a cut-out space by removing a lower portion of the mounting portion inclusive of the folded portion, and only the remaining upper portion is secured to the inner side surface at the corner.

Therefore, the counter-fastener cannot be supported, or no clip for supporting the counter-fastener can be mounted, at the corner of the fastener because of the cut-out space. For this reason, the portion of the counter-fastener corresponding to the corner of the depression floats up.

OBJECT AND SUMMARY OF THE INVENTION

An object of the invention is to provide a device for mounting a window pane, which can prevent floating-up of the counter-fastener at the corner of the depression and permits the counter-fastener to be held in position reliably.

To attain the above object of the invention, there is provided a device for mounting a window pane, in which an auxiliary member for holding the counter-fastener or a clip holder for holding a clip for holding the counter-fastener is secured to the inner side surface of the depression at the corner to hold the portion of the counter-fastener at the corner of the depression with the auxiliary member or clip held by the clip holder.

Since the auxiliary member or clip holder is provided at the corner of the depression of the body panel so as to clamp the counter-fastener, it is possible to prevent floating-up of the counter-fastener at the corner.

The above and other objects and features of the invention will become more apparent from the following detailed description with reference to the accompanying drawings.

BRIEF DESCRIPTION OF THE DRAWINGS

FIG. 1 is a fragmentary front view showing a first embodiment of the device according to the invention with a counter-fastener mounted;

FIG. 3 is a sectional view taken alone line III—III in FIG. 1;

FIG. 4 is a sectional view taken along line IV—IV in FIG. 1;

FIG. 5 is an exploded perspective view showing a second embodiment of the device according to the invention;

FIG. 6 is a sectional view showing a corner portion of the device shown in FIG. 5;

FIG. 8 is a sectional view showing a corner portion of the device shown in FIG. 7.

DETAILED DESCRIPTION OF THE PREFERRED EMBODIMENTS

Figure 2:
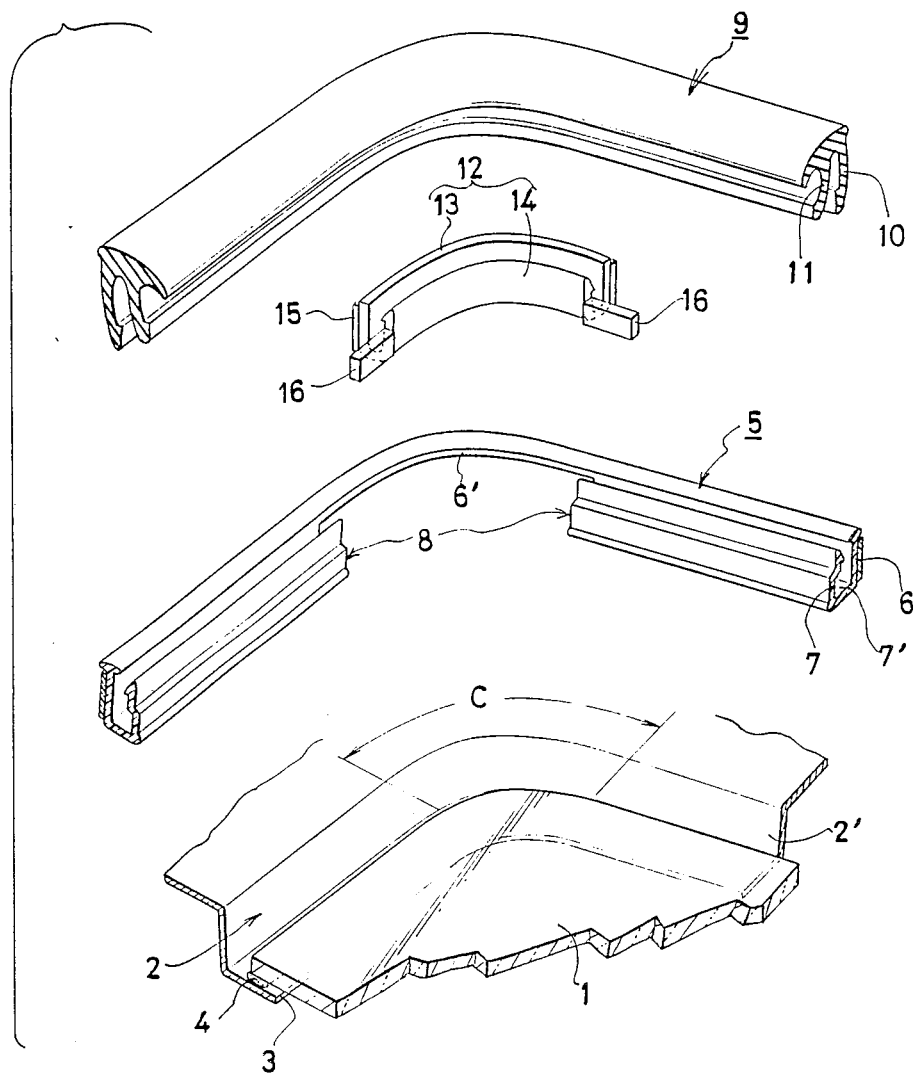
FIG. 2 is an exploded perspective view showing the device shown in FIG. 1.

Referring to the Figures, reference numeral 1 designates a window pane of a windshield or rear window of a vehicle, numeral 2 a depression formed in a vehicle panel and enclosing an area slightly larger than the area of the window pane 1, numeral 3 a window opening formed in the bottom of the depression and slightly smaller than the window pane, numeral 4 a sealant, by which the edge of the window pane 1 is bonded to the edge of the bottom of the depression 2, numeral 5 a fastener set along the side surface 2' of the depression 2 and with a mounting portion 6 secured with a double-sided adhesive tape or thermosetting adhesive tape 15, numeral 7 a folded portion extending from the lower end of the mounting portion 6 in a folded fashion and having an engagement portion like a pawl, and numeral 8 a cut-out space formed by cutting out a lower half of a portion of the mounting portion 6 and a corresponding portion of the folded portion 7. An upper half portion 6' of the mounting portion 6 facing the cut-out space is secured by an adhesive tape to the inner surface of the depression 2 at a corner C.

FIGS. 1 to 4 show a first embodiment of the device according to the invention. In this embodiment, a counter-fastener 9 is a flexible plastic extrusion molding having an engagement portion 10 to be received in a groove formed between the mounting portion 6 and folded portion 7 of the fastener 5 and non-detachably engage with the pawl of the folded portion 7. The counter-fastener 9, as shown, also has a leg portion 11 provided in front of the engagement portion 10 and having a pawl extending into the sealant 4. This pawl offers resistance against pull-out.

An auxiliary member 12 is secured in position such that it occupies the cut-out space 8 of the fastener 5. The auxiliary member 12 has substantially the same sectional profile as the removed portions of the mounting portion 6 and folded portion 7 removed to form the cut-out space 8, and it has a base portion 13 corresponding to the removed portion of the mounting portion 6 and a folded portion 14 corresponding to the removed portion of the folded portion 7. The portions 13 and 14 are injection molded from a plastic material and are curved to be complementary to the inner periphery of the corner C. The auxiliary member 12 may be secured to the fastener 5 on the inner surface thereof at the corner exposed by the cut-out space 8 with a double-sided adhesive tape of thermosetting adhesive tape 15 provided on the back side of the base portion 13. Alternatively, it may be secured to the fastener with a projection 16 projecting from each end of it fitted in the groove between the mounting portion 6 and the folded portion 7 of the fastener in such manner as not to impede the support of the leg portion 11 of the counter-fastener 9. It is of course possible to use the securement of the auxiliary member 12 to the inner surface of the fastener 5 with the adhesive tape 15 and securement of the auxiliary member 12 with the projections 16 in combination. Further, it is possible to fusedly secure the projections 16 to the fastener 5. Furthermore, it is possible to mold the auxiliary member 12 integrally with the fastener 5 so as to occupy the cut-out space 8.

When the auxiliary member 12 is fushion-secured or integrally molded, the cut-out space 8 of the fastener 5 can be of minimum size, and it is possible to remove the folded portion 7 of the fastener 5 to leave only the mounting portion 6 thereof. When it is desired to change the shape of the cut-out space 8 of the fastener 5, the shape of the auxiliary member 12 should be changed correspondingly, for instance by reducing the height of or omitting the base portion 13.

In the illustrated embodiment, the folded portion 7 of the fastener 5 is like a crankshaft in its sectional profile, and its pawl for engaging with the engagement portion 10 of the counter-fastener 9 is staircase-like so that the groove formed between it and the mounting portion 6 has an increased-width portion 7'. The projection 16 projecting from each end of the auxiliary member 12 extends into the increased-width portion 7'.

With the auxiliary member 12 secured so as to occupy the cut-out space 8 of the fastener 5, the engagement portion 10 of the counter-fastener 9 can be supported by the folded portion 7 of the fastener 5 in a straight plane of the inner surface of the depression 2 as shown in FIG. 3. In addition, at the corner C of the inner surface of the depression 2, the counter-fastener 9 can be supported by the folded portion 14 of the auxiliary member 12, thus preventing floating-up of the counter-fastener 9 at the corner C.

FIGS. 5 and 6 show a second embodiment of the device according to the invention. In this embodiment, while the counter-fastener 9 has the engagement portion 10 and leg portion 11, the leg portion 11 has a cut-out space 11' formed in a position corresponding to the cut-out space 8 of the fastener 5. The engagement portion 10 does not have any pawl in its portion corresponding to the cut-out space 11' for engagement with the folded portion 7 of the fastener 5. Instead, it has pawls 10' for engagement in holes 14' formed in the folded portion 14 of the auxiliary member 12. While in this embodiment two pawls 10' and two holes 14' are provided, it is possible to provide only a single pawl and a single hole or provide three or more pawls and the same number of holes. The counter-fastener 9 is formed by injection molding instead of extrusion molding because it has the cut-out space 11' and pawls 10'.

By securing the auxiliary member 12 in position to occupy the cut-out space 8 of the fastener 5 and downwardly pushing the engagement portion 10 of the counter-fastener 9 into the space between the base portion 13 and the folded portion 14, the pawls 10' are received in the holes 14' and engaged with the upper edge thereof such that they will not detach. The counter-fastener thus can be supported at the corner of the depression 2 as well.

In the illustrated embodiment, the auxiliary member 12 is secured with the adhesive tape 15 provided on the back surface of the base portion 13. However, it is possible to provide the projection 16 at each end of the auxiliary member as in the previous embodiment, or such projection 16 may be fusedly secured to the fastener 5.

The auxiliary member 12 has two damper portions 12', which extend obliquely downwardly so that their free ends are in contact with the bottom of the depression 2. These damper portions 12' absorb fluctuations in the depth of the depression 2 and also serve as receptacles of the sealant 4 used to bond the edge of the window pane to the edge of the bottom of the depression 2.

Figure 7:
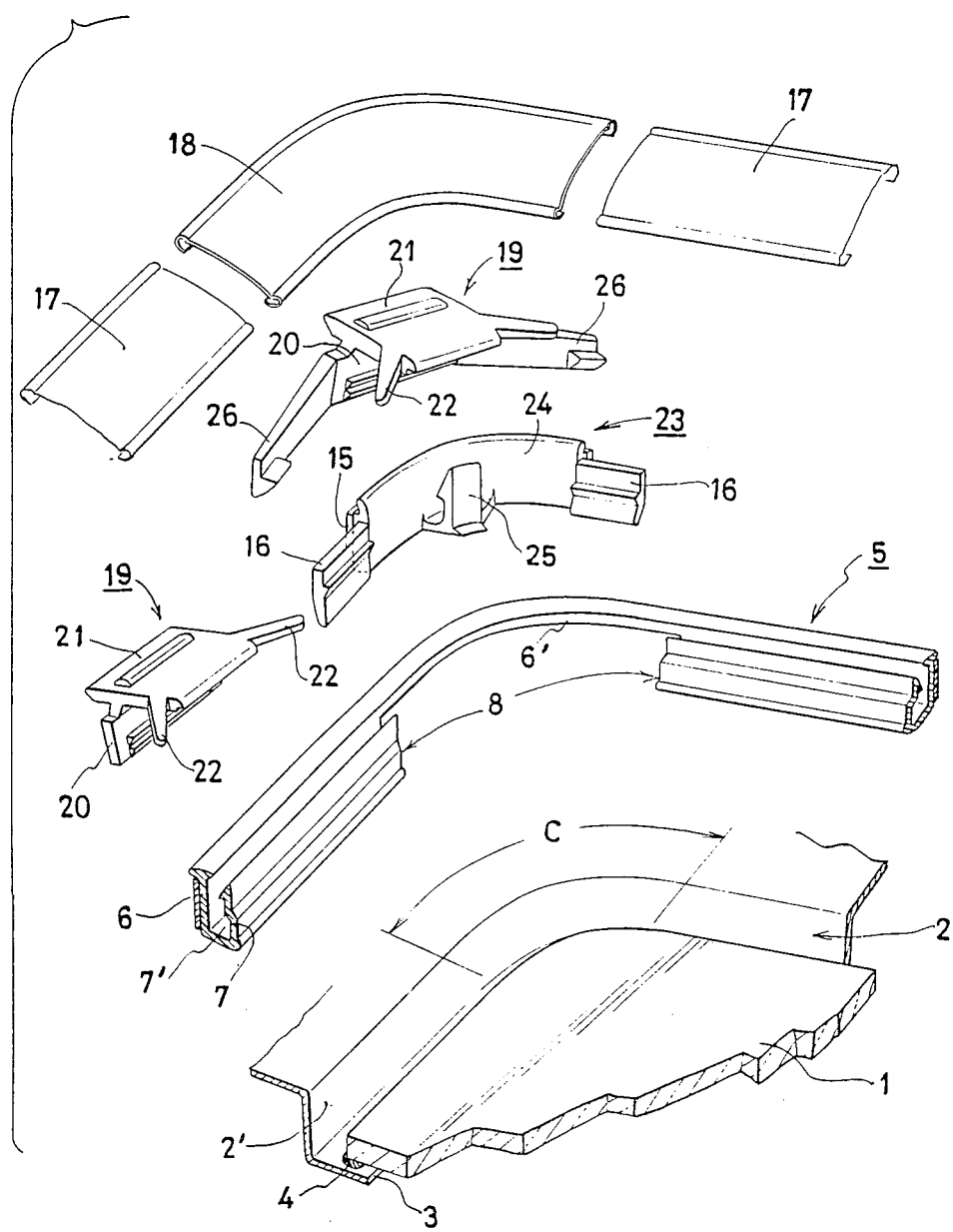
FIG. 7 is an exploded perspective view showing a third embodiment of the device according to the invention.

FIGS. 7 and 8 show a third embodiment of the device according to the invention. In this embodiment, the counterfastener is made of a metal and has a C-shaped sectional profile. It consists of straight members 17 and a curved member 18 to be fit in respective straight and curved corner portions of a large depression formed in a vehicle panel. An end of each straight member 17 is fittedly coupled to each end of the curved member 18.

The straight member 17 is supported by a plurality of plastic clips 19, which are fitted at a suitable interval into the space between the mounting portion 6 and folded portion 7 of the fastener 5 secured to a straight portion of the inner side surface of the depression 2 and held by the pawl of the folded portion 7. The clip 19 has a leg portion 20 inserted into the space between the mounting portion 6 and the folded portion 7 and engaged with the pawl of the folded portion 7, a substantially horizontal flat head portion 21 integral with the top of the leg portion 20 and a pair of projections 22 projecting from the opposite sides of the front end of the head portion 21. The clip 19 is moved along the counter-fastener 17 to a predetermined position. The projections 22 are in contact with the counter-fastener 17, the rear end of the head portion 21 is in contact with the other side of the counter-fastener 17 so that the clip 19 is mounted on the counter-fastener 17 with the restoring force of the projections 22. Thus, the straight member 17 can be mounted by inserting the leg portion 20 of the clip depending from the counter-fastener into the space between the mounting portion 6 and the folded portion 7 of the fastener 5.

The curved member 18 is also supported by the clip 19. To this end, a clip holder 23 is secured in position to occupy the cut-out space 8 formed in the fastener 5 corresponding to the inner side surface of the depression 2 at the corner C. The clip holder 23 is an injection molding of a plastic material and has a curved portion 24 corresponding to the inner side surface of the corner C and a folded portion 25 extending from the lower end of the curved portion and having a pawl engaging with a pawl of the clip 19. The folded portion 25 has a reduced width.

The clip holder 23 may be applied to the side inner surface 2' of the depression 2 at the corner C with an adhesive tape 15 provided on the back surface of the curved portion 24. Alternatively, a projection 16 projection from each end of the clip holder 23 may be received in the groove between the mounting portion 6 and the folded portion 7 of the fastener 5. As a further alternative, the projections 16 may be fusedly secured to the fastener 5. The clip 19 thus is mounted on the curved member 18 as well, the clip holder 23 is secured in position in the cut-out space 8 of the fastener 5, and the leg portion 20 of the clip 19 is supported by the clip holder 23. Thus, the floating-up of the curved member 18 can be prevented.

In this embodiment, the clip mounted on the curved member 18 has a flat leg portion 20 like the clip mounted on the straight member 17. However, the engagement portion is suitably curved with the same radius of curvature as the curved portion 24 of the clip holder 23.

Where the clip for the curved member 18 is provided with inclined arm portions 26 extending through the cut-out space 8 of the fastener 5 and reaching the lower portion of the corner of the window pane 1 so as to be slightly downwardly pushed by the lower surface of the window pane, a force urging the clip against the body panel is produced by the force exerted by the arm portions 26 to the window pane, which is effective for prevention of the separation of the fastener.

In each of the illustrated embodiments, the fastener 5 has a substantially C-shaped sectional profile. This sectional profile, however, is by no means limitative, and it is possible to use, for example, a fastener having a substantially U-shaped sectional profile.

As has been shown, the counter-fastener is clamped with an auxiliary member or a clip holder provided in the corner of a depression of a vehicle panel, in which a window pane is mounted. Thus, it is possible to effectively prevent the floating-up of the counter-fastener at the corner of the depression.

What is claimed is:

1. A device for mounting a window panel in a depression formed in a vehicle panel and enclosing an area slightly larger than the area of said window pane, comprising a plastic fastener set along the inner side surface of said depression and a counter-fastener supported by said fastener to hold the edge of said window pane, said fastener being provided with an auxiliary member provided at a position corresponding to the corner of said depression for supporting said counter-fastener.

2. A device for mounting a window pane in a depression formed in a vehicle panel and enclosing an area larger than the area of said window pane, comprising a plastic fastener set along the inner side surface of said depression, a counter-fastener and clips provided at a suitable interval on said fastener to support said counter-fastener, said counter-fastener being supported by said clips to hold the upper side and edges of the opposite sides of said window pane, said fastener being provided with a clip holder for holding a clip along the inner side surface of said depression at the corner.

* * * * *

UNITED STATES PATENT AND TRADEMARK OFFICE
CERTIFICATE OF CORRECTION

PATENT NO.    : 4,840,001

DATED         : Jun. 20, 1989

INVENTOR(S)   : Toshihide Kimisawa

It is certified that error appears in the above-identified patent and that said Letters Patent is hereby corrected as shown below:

On the title page:

The total number of drawing sheets is incorrectly recorded, "1", should be:

--4--

Signed and Sealed this

Eighth Day of May, 1990

Attest:

HARRY F. MANBECK, JR.

*Attesting Officer*            *Commissioner of Patents and Trademarks*